UNITED STATES PATENT OFFICE.

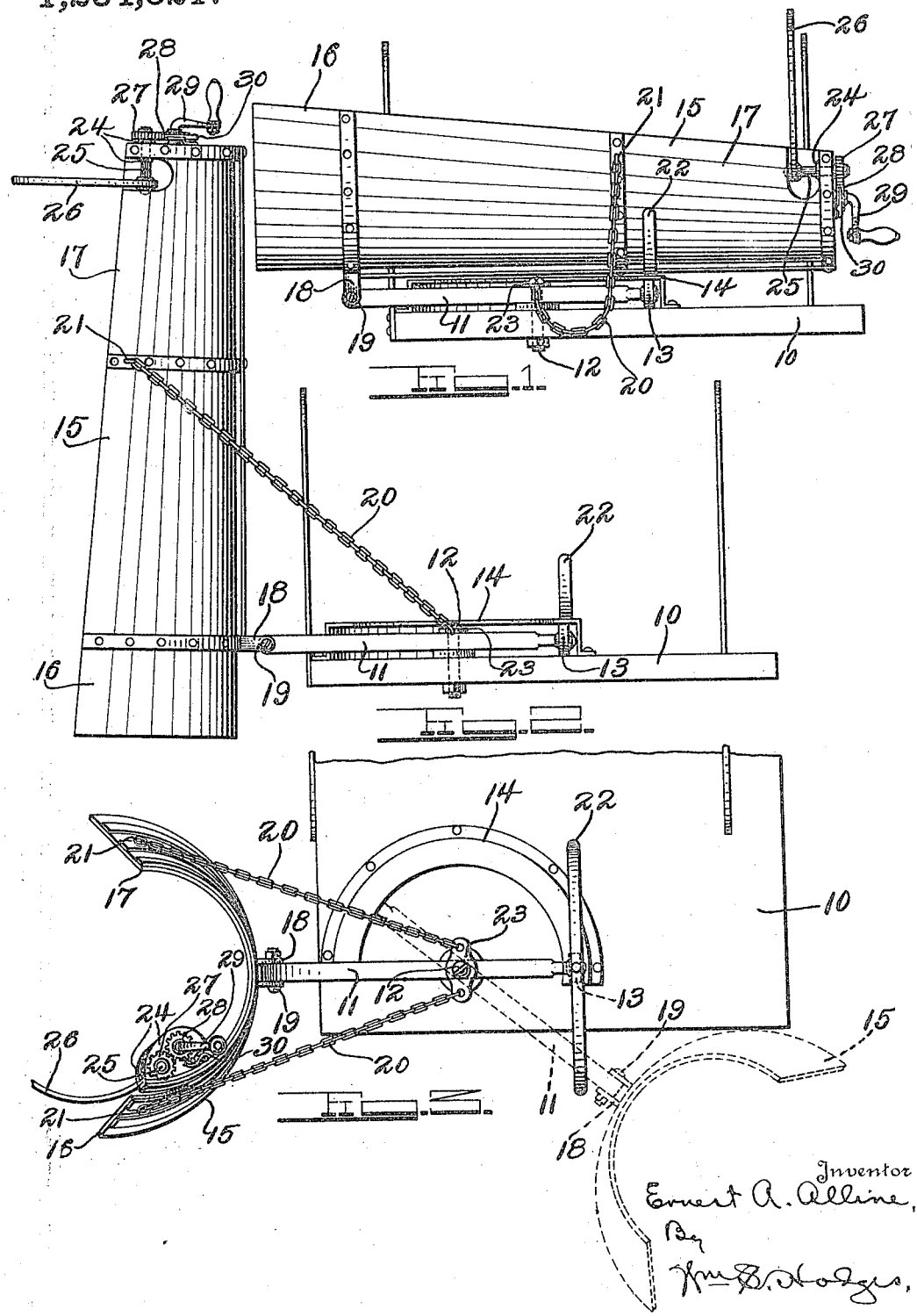

ERNEST A. ALLINE, OF MARION, OHIO.

CORN-SHOCKING DEVICE.

1,234,521.   Specification of Letters Patent.   Patented July 24, 1917.

Application filed April 1, 1916. Serial No. 88,309.

*To all whom it may concern:*

Be it known that I, ERNEST A. ALLINE, a citizen of the United States, residing at Marion, in the county of Marion and State of Ohio, have invented new and useful Improvements in Corn-Shocking Devices, of which the following is a specification.

This is an improved shocking attachment for corn harvesters.

One of the objects of the invention is to provide a device of simple construction capable of being applied to corn harvesters now in general use, and by means of which the harvested corn may be conveniently and efficiently arranged into shocks. A further object is to provide a shocking attachment positioned to receive the harvested corn stalks during the shock forming steps, and capable of placing the completed shocks upon the ground in upright position, in such manner that the deposited shocks will require no further attention. A further object is to provide an improved mounting for the shocking device, which will permit the latter to assume a horizontal position to receive the harvested corn stalks, and to be readily moved to a position which will permit of the discharge of the shocks in vertical position and to one side of the harvester.

The invention will be hereinafter fully set forth and particularly pointed out in the claims.

In the accompanying drawing:—

Figure 1 is a rear elevation illustrating the invention, with the parts in position to receive the corn stalks. Fig. 2 is a similar view showing the shocking trough moved to vertical position. Fig. 3 is a plan view of Fig. 2.

Referring to the drawing, 10 designates a platform, of any desired construction, secured in any suitable manner to the frame of a corn harvester. Inasmuch as the invention may be applied to various forms of corn harvesters, no attempt is made to illustrate such harvester. Pivotally mounted upon the platform 10, is a carrier bar 11, the pivot pin 12 being passed through said bar approximately midway of the ends thereof, the outer end of said bar projecting beyond the edges of said platform, the inner end thereof being provided with an antifriction roller 13, which bears upon a track or wearing plate of suitable construction. Overhanging the inner end of the carrier bar 11, is a curved guide bar 14, curved on an arc having its center at the axis of the pivot 12, so that when the bar 11 swings upon said pivot, the roller 13 will always be beneath said guide bar, the arrangement being such that said guide bar will arrest any upward movement of the inner end of said bar, due to the weight of the corn stalks, applied to the other end of said bar, in a manner that will appear later.

The shocking trough 15, is semicircular in cross section and of larger diameter at one end 16 than at the end 17, and near the end 16 is provided with ears 18, pivotally connected with the outer end of the bar 11 by a suitable pivot pin 19. Pivotal movement of the trough 15 is limited in suitable manner, preferably by means of flexible members or chains 20 attached to ears 21, secured to the exterior of the trough, and also connected with the bar 23 pivotally engaging the pin 12. The length of the flexible members 20 is such that the trough will be maintained in an approximately vertical position, when swung off of the platform 10, a cradle 22, supported by the guide bar 14, being provided to support the smaller end of the trough when said trough is in horizontal position.

Rotatably mounted in bearings 24, secured to the inner face of the trough 15, near the end 17, is a shaft 25, to which is rigidly attached a hook-like shock retaining arm 26, the free end of which contacts with the inner face of the trough adjacent the opposite edge. Attached to the outer end of the shaft 25 is a pinion 27 which meshes with a gear 28, secured to a crank shaft 29 suitably supported, said crank shaft being provided with a pawl and ratchet connection 30, to prevent reverse rotation of said shaft when desired.

In practice the trough 15 is placed in stalk receiving position, by swinging the same into horizontal position as illustrated in Fig. 1. The harvested stalks are deposited into the trough, lengthwise thereof, by suitable carrier mechanism, and when the desired number of stalks have been so deposited, the crank arm 29 is operated to cause the arm 26 to extend across the open side of the trough, and to grip the upper portions of the stalks, clamping them in place. The pawl and ratchet mechanism 30 prevents reverse movement of the arm 26, and while the stalks are held by said arm, the shock may be bound or tied by hand, in any suitable manner. Just as soon as the shock is bound, the trough 15 is moved to vertical position upon the pivot 18, and then the bar 11 is swung on the pivot 12, until the trough is in the position illustrated in dotted lines, Fig. 3, whereupon the pawl and ratchet mechanism 30 is disengaged, to permit reverse rotation of the handle 29, whereby the arm 26 may be disengaged from the shock and the latter allowed to drop to the ground, the open side of the trough 15 permitting the trough to be drawn away without interfering with the deposited shock. It will be understood that by reason of the shock being tightly bound at the top, the stalks will spread at the bottom of the shock, so as to provide a relatively large foundation which will prevent the shock from tipping over when it is released from the trough.

Having thus explained the nature of my invention, and described an operative manner of constructing and using the same, although without attempting to set forth all of the forms in which it may be made, or all of the forms of its use, what I claim is:

1. An improvement in corn shocking devices comprising a platform, a carrier bar pivoted between its ends to said platform and mounted to swing horizontally, an overhanging track curved on an arc concentric with the pivot of said bar, the inner end of the bar extending beneath said track, a shocking trough pivotally connected with the outer end of said bar, flexible members for limiting the dumping movement of said trough, and means at the upper end of the trough for retaining stalks therein.

2. An improvement in corn shocking devices comprising a platform, a pivot pin secured to said platform, a carrier bar pivoted between its ends to said platform and mounted to swing horizontally, an overhanging track curved on an arc concentric with said pin, the inner end of the bar extending beneath said track, a shocking trough pivotally connected with the outer end of said bar, an anchor bar engaged by said pin, flexible connections between the anchor bar and the shocking trough above the pivotal support of the latter, and means at the upper end of the trough for retaining stalks therein.

3. An improvement in corn shocking devices comprising a platform, a carrier bar pivoted to said platform and mounted to swing horizontally, a shocking trough movably connected near one end with one end of said carrier bar, means for limiting relative movement of said trough and said carrier bar, a longitudinal shaft rotatably mounted within said trough near upper end thereof, a retaining arm attached to said shaft and extending transversely of the trough, and means for controlling said shaft.

4. An improvement in corn shocking devices comprising a platform, a carrier bar pivoted between its ends to said platform and mounted to swing horizontally, means engaging the inner end of the bar to prevent upward movement thereof, a shocking trough pivotally connected near its lower end with the outer end of said bar, means for limiting pivotal movement of said trough, bearings secured to the inner face of the trough near the upper end thereof, a short shaft mounted in said bearings, a shock retaining arm secured to said shaft, and means for actuating said shaft.

In testimony whereof I have hereunto set my hand in presence of two subscribing witnesses.

ERNEST A. ALLINE.

Witnesses:
J. H. EYMON,
E. A. EDMONDSON.

Copies of this patent may be obtained for five cents each, by addressing the "Commissioner of Patents, Washington, D. C."